United States Patent
Eriksson et al.

(10) Patent No.: US 8,048,257 B2
(45) Date of Patent: Nov. 1, 2011

(54) ADHESIVE SYSTEM AND METHOD OF PRODUCING A WOOD BASED PRODUCT

(75) Inventors: Anders Per Eriksson, Nacka (SE); Joanna Fare, Huddinge (SE); Anna Kristina Furberg, Sundbyberg (SE); Farideh Khabbaz, Bromma (SE)

(73) Assignee: Akzo Nobel Coating International B.V., Arnhem (NL)

( * ) Notice: Subject to any disclaimer, the term of this patent is extended or adjusted under 35 U.S.C. 154(b) by 1152 days.

(21) Appl. No.: 11/823,246

(22) Filed: Jun. 27, 2007

(65) Prior Publication Data

US 2007/0298274 A1 Dec. 27, 2007

Related U.S. Application Data

(63) Continuation-in-part of application No. 11/473,963, filed on Jun. 23, 2006.

(60) Provisional application No. 60/817,733, filed on Jun. 30, 2006.

(51) Int. Cl.
*B32B 29/06* (2006.01)

(52) U.S. Cl. ........ 156/325; 156/326; 156/328; 428/528; 428/535; 428/537.1

(58) Field of Classification Search .................. 428/528, 428/535, 537.1; 156/325, 326, 328
See application file for complete search history.

(56) References Cited

U.S. PATENT DOCUMENTS

| | | | |
|---|---|---|---|
| 2,051,025 A | 8/1936 | Bauer | |
| 2,102,937 A | 12/1937 | Bauer | |
| 2,250,681 A | 7/1941 | Schwartz | |
| 2,282,364 A | 5/1942 | Kunze et al. | |
| 3,345,198 A | 10/1967 | Winkler et al. | |
| 3,355,307 A | 11/1967 | Schoenberger et al. | |
| 3,361,585 A | 1/1968 | Armour et al. | |
| 3,487,033 A | 12/1969 | McElmury et al. | |
| 3,941,728 A | 3/1976 | Solenberger | |
| 3,944,428 A * | 3/1976 | Schoenberg et al. | 428/184 |
| 4,018,959 A | 4/1977 | Demko et al. | |
| 4,183,997 A | 1/1980 | Stofko | |
| 4,350,788 A * | 9/1982 | Shimokawa et al. | 524/309 |
| 4,687,809 A | 8/1987 | Kamikaseda et al. | |
| 4,910,048 A | 3/1990 | Sinclair | |
| 5,000,783 A | 3/1991 | Dingeman et al. | |
| 5,112,391 A | 5/1992 | Owen et al. | |
| 5,185,212 A | 2/1993 | Spada et al. | |
| 5,190,996 A | 3/1993 | Foran et al. | |
| 5,247,066 A | 9/1993 | Schoenberg et al. | |
| 5,283,277 A | 2/1994 | Kissel | |
| 5,384,187 A | 1/1995 | Uemura et al. | |
| 5,498,224 A | 3/1996 | Kauffman et al. | |
| 5,627,261 A | 5/1997 | Albrecht et al. | |
| 5,684,075 A | 11/1997 | Patel et al. | |
| 5,804,618 A | 9/1998 | Mafoti et al. | |
| 5,849,405 A | 12/1998 | Wang et al. | |
| 5,858,554 A * | 1/1999 | Neal et al. | 428/537.5 |
| 5,889,107 A | 3/1999 | Jakob et al. | |
| 6,048,929 A | 4/2000 | Moffett | |
| 6,207,176 B1 | 3/2001 | Howard et al. | |
| 6,255,369 B1 | 7/2001 | Philbin et al. | |
| 6,440,204 B1 | 8/2002 | Rogols et al. | |
| 6,562,325 B2 | 5/2003 | Vitale et al. | |
| 6,566,472 B1 | 5/2003 | Baumstark et al. | |
| 6,706,145 B2 | 3/2004 | Werres et al. | |
| 6,710,175 B2 | 3/2004 | Anderson et al. | |
| 6,746,542 B1 | 6/2004 | Lorencak et al. | |
| 6,753,361 B2 | 6/2004 | Kroner et al. | |
| 6,803,420 B2 | 10/2004 | Cleary et al. | |
| 6,956,070 B2 | 10/2005 | Fujiwara et al. | |
| 7,034,068 B1 | 4/2006 | Negele et al. | |
| 7,074,845 B2 | 7/2006 | Laleg | |
| 7,235,608 B2 | 6/2007 | Hu et al. | |
| 2002/0015823 A1 | 2/2002 | Mauler et al. | |
| 2002/0096288 A1 | 7/2002 | Allen | |
| 2003/0102097 A1 | 6/2003 | Moffett | |
| 2003/0116294 A1 | 6/2003 | Kehrer et al. | |
| 2003/0119949 A1 | 6/2003 | Favis et al. | |
| 2003/0155071 A1 | 8/2003 | Werres et al. | |
| 2004/0014844 A1 | 1/2004 | Helbling et al. | |
| 2004/0018332 A1 | 1/2004 | Hu et al. | |
| 2004/0143038 A1 | 7/2004 | Aberle | |

(Continued)

FOREIGN PATENT DOCUMENTS

CL 1710-2006 6/2006

(Continued)

OTHER PUBLICATIONS

A.M. Prokhorov, *Great Soviet Encyclopedia*, v. 23, 1976, p. 463-464. (English-language summary of "System" is included as provided by the foreign associate).

(Continued)

*Primary Examiner* — Leszek Kiliman
(74) *Attorney, Agent, or Firm* — Kenyon & Kenyon LLP

(57) ABSTRACT

The invention relates to a method of producing a wood based product, comprising applying an adhesive system onto one or more pieces of a wood-based material, and joining the one or more pieces with one or more further pieces of a material, the adhesive system comprises one component comprising starch and another component comprising one or more polymers (P) containing an amine group or an amide group. The present invention also relates to an adhesive system comprising one component comprising starch and another component comprising one or more polymers (P) containing an amine group or an amide group, the two components being present as unmixed separate components. The invention further relates to a wood based product.

14 Claims, No Drawings

U.S. PATENT DOCUMENTS

| | | |
|---|---|---|
| 2004/0254285 A1 | 12/2004 | Rodrigues et al. |
| 2005/0022956 A1 | 2/2005 | Rodriguez et al. |
| 2005/0150621 A1 | 7/2005 | Neivandt et al. |
| 2005/0197441 A1 | 9/2005 | Shibutani et al. |
| 2006/0128840 A1 | 6/2006 | Graux et al. |
| 2006/0183822 A1 | 8/2006 | Nguyen-Kim et al. |
| 2007/0004828 A1 | 1/2007 | Khabbaz |
| 2007/0270608 A1 | 11/2007 | Boersma et al. |
| 2007/0298274 A1 | 12/2007 | Eriksson et al. |
| 2009/0317651 A1 | 12/2009 | Khabbaz et al. |

FOREIGN PATENT DOCUMENTS

| | | |
|---|---|---|
| CL | 1711-2006 | 6/2006 |
| CN | 1033525 | 6/1989 |
| CN | 1742055 | 3/2006 |
| DE | 43 08 089 A1 | 9/1994 |
| DE | 4308089 * | 9/1994 |
| EP | 0 001 501 B1 | 4/1979 |
| EP | 0 229 741 B1 | 7/1987 |
| EP | 0 948 959 A2 | 10/1999 |
| EP | 1 486 547 A2 | 12/2004 |
| GB | 1 456 629 A | 11/1976 |
| GB | 2 084 588 A | 4/1982 |
| JP | 60-53578 A | 3/1985 |
| JP | 61-21171 | 1/1986 |
| JP | 6-299136 A | 10/1994 |
| JP | 2004-35580 A | 2/2004 |
| RU | 2172749 | 9/2000 |
| TW | 592722 | 6/2004 |
| WO | WO 97/37842 | 10/1997 |
| WO | 01/85441 A1 | 11/2001 |
| WO | 02/088468 A2 | 11/2002 |
| WO | WO02/088468 * | 11/2002 |
| WO | 03/069061 A1 | 8/2003 |
| WO | 03/087473 A1 | 10/2003 |
| WO | 03/102065 A1 | 12/2003 |
| WO | WO 2004/029147 | 4/2004 |
| WO | 2005/113700 A1 | 12/2005 |
| WO | WO 2007/004978 | 1/2007 |
| WO | WO 2007/004980 | 1/2007 |
| WO | WO 2007/149037 | 12/2007 |

OTHER PUBLICATIONS

Bastioli, "Starch," *Encyclopedia of Polymer Science and Technology*, 2004.

Matuana et al., "Wood Composites," *Enc. of Poly. Sci. and Tech.*, 2004.

European Search Report for Application No. EP 05 10 6006 dated Oct. 5, 2005.

Abstract No. 2003-058843 abstracting WO 02/088468 A2.

Derwent Abstract No. 0004095866 abstracting EP 0 229 741 B1.

Abstract No. 1994-286703 abstracting DE 43 08 089 A1.

Abstract No. 1985-112824 abstracting JP 60-53578 A.

Patent Abstracts of Japan abstracting JP 2004-35580.

Machine translation of JP 2004-35580.

Patent Abstracts of Japan abstracting JP 6-299136.

Machine translation of JP 6-299136.

Imam, S. H. et al., "Wood Adhesive from Crosslinked Poly(vinyl Alcohol) and Partially Gelatinized Starch: Preparation and Properties," Starch/Starke 51, No. 6 (1999) pp. 225-229.

Mori, A. et al., "A Honeymoon-Type Adhesive for Wood Products Based on Acetoacetylated Poly(vinyl alcohol) and Diamines: Effect of Diamines and Degree of Acetoacetylation," Journal of Applied Polymer Science, vol. 91 (2004), pp. 2966-2972.

English-language Abstract of Russian document by Ushakov D.N., 2006.

International Search Report and Written Opinion, PCT/SE2007/050405, mailed Sep. 29, 2007.

International Preliminary Report on Patentability, PCT/SE2007/050405, mailed Sep. 30, 2008.

* cited by examiner

US 8,048,257 B2

ADHESIVE SYSTEM AND METHOD OF PRODUCING A WOOD BASED PRODUCT

The present invention relates to an adhesive system and a method of producing a wood based product.

INTRODUCTION

Formaldehyde based resins such as phenol-formaldehyde resin, melamine-formaldehyde resin and urea-formaldehyde resin are widely used as binders in the production of wood based products. Examples of such wood based products are composite products comprising layers glued together such as plywood, laminated flooring products and veneered products used in, e.g., furniture. Further examples of such wood based products are composite products such as particle-, chip- and fibreboards wherein wood chips and/or fibres, together with a binder, are pressed to form a board.

Upon curing a formaldehyde based resin, formaldehyde may be released both during the manufacture of the wood based product and also later during use of the product. Formaldehyde emission to indoor air is a major concern since many years for health reasons.

There is an increasing demand for formaldehyde-free wood adhesives which give sufficient bond strength and overall end-product quality making them suitable as alternatives to prior art adhesives containing formaldehyde based resins.

Water resistance and bond strength are generally important properties reflecting quality for the wood based products. Generally there exist specific quality parameters required for meeting an established standard for a specific end-product. For example, a particle board needs to meet certain standards in terms of, e.g., internal bonding, thickness swelling and water absorption, while a laminated flooring product generally needs to meet certain standards in terms of, e.g., delamination and fiber tear.

As an alternative to formaldehyde based resins in wood adhesive compositions starch based adhesives have been proposed. Imam et al., "Wood Adhesive from Crosslinked Poly (vinyl alcohol) and Partially Gelatinized Starch: Preparation and Properties", Starch/Stärke 51 (1999) Nr. 6, S. 225-229, discloses an adhesive composition comprising starch and polyvinyl alcohol, the composition further comprising a melamine resin. U.S. Pat. Nos. 2,051,025, 2,102,937, 3,487, 033, 3,355,307 disclose starch based adhesives used for making corrugated paperboard. WO 03/069061 A1 discloses a starch based adhesive used in making a paperboard product.

Starch based adhesive systems have so far not been used in particle board manufacturing processes.

There is still a need for alternative starch based adhesive systems suitable for producing wood based products, such as laminated products or particle boards.

Accordingly, the present invention provides a method of producing a wood based product and it also provides an adhesive system.

THE INVENTION

The present invention relates to a method of producing a wood based product, comprising applying an adhesive system onto one or more pieces of a wood-based material, and joining the one or more pieces with one or more further pieces of a material, preferably wood based material, the adhesive system comprises one component comprising starch and another component comprising one or more polymers (P) containing an amine group or an amide group, the two components are applied onto the wood based material as separate components. The two components are suitably applied in a sequence of time from each other. Alternatively, the two components are suitably applied simultaneously onto the wood based material.

By the term "adhesive system" is herein meant a combination of components which function as, and is intended to be used as, an adhesive when combined.

In the term "adhesive" is herein also included the term "binder".

By the term "amide group" is herein included formamide group.

By wood-based materials is herein, beside solid wood, also included wooden materials such as fibre-, chip-, and particleboard materials. The surfaces to be joined may be of the same or different type of wood based material.

The wood based material can be any type and form of wood based material such as chips, fibres, sheets, laminas, veneers, pieces etc.

The present invention also relates to an adhesive system comprising one component comprising starch and another component comprising one or more polymers (P) containing an amine group or an amide group, the two components being present as unmixed separate components.

The present invention also relates to the use of the adhesive system according to the invention for producing a wood based product.

The invention further relates to a wood based product comprising pieces of wood based material joined with an adhesive comprising starch and one or more polymers (P) containing an amide group or an amide group.

The component comprising starch may comprise a starch solution or dispersion, or comprise the starch as a solid material. The component comprising the one or more polymers (P) may comprise a solution or dispersion or comprise the polymer (P) as a solid material. Preferably the one or more polymers (P) are comprised in a solution or dispersion.

The components of the adhesive system are preferably applied onto the wood based material in a sequence of time from each other, as a first component applied and as a second component applied onto the wood based material.

In one embodiment, a first applied component, if being a solution or dispersion, is dried after application before the second component is applied.

In one embodiment the first component of the adhesive system applied onto the wood based material suitably comprises starch and the second component applied suitably comprises the one or more polymers (P). The first component applied suitably comprises a starch solution or dispersion and the second component applied suitably comprises a solution or dispersion of the one or more polymers (P).

In one embodiment, the first component applied comprising starch is suitably dried after application and before the second component applied comprising the one or more polymers (P) is applied.

In one embodiment, the first component applied suitably comprises solid starch and the second component applied suitably comprises a solution or dispersion of the one or more polymers (P).

In one embodiment, the first component of the adhesive system applied onto the wood based material suitably comprises the one or more polymers (P) and the second component applied suitably comprises starch. The first component applied suitably comprises a solution or dispersion of the one or more polymers (P) and the second component applied comprises starch, either as a solution or dispersion, or as a solid material.

In one embodiment, the first component comprising the one or more polymers (P) is suitably dried after application and before the second component comprising starch is applied.

The solid starch used in the present invention is suitably a powder and may have various moisture contents.

The weight ratio starch to the one or more polymers (P) is suitably from about 1:2 to about 100:1, preferably from about 1:1 to about 50:1, most preferably from about 2:1 to about 20:1.

The one or more polymers (P) are suitably present in an aqueous composition comprising from about 0.1 to about 99 weight % of polymer (P), preferably from about 1 to about 80 weight %, more preferably from about 3 to about 50 weight % most preferably from about 5 to about 20 weight %.

In one embodiment, the method comprises a method of producing a laminated or veneered product, the method suitably comprises applying the adhesive system according to the invention onto a sheet-like material, such as a lamina, board, veneer, or the like, and joining it with a further sheet-like material.

In one embodiment, the method comprises a method of producing a composite product wherein the pieces of wood based material are wood chips, in which the term "wood chips" herein includes chips, shavings, flakes, sawdust particles and any similar finely divided wood based material. The composite product is suitably a chip-, particle- or fibre board, or an oriented strand board. The method comprises applying the adhesive system onto chips of a wood-based material, and joining the chips. The method suitably comprises mixing wood based chips with the adhesive system, forming a mixture of chips and adhesive system, and pressing the same into a board.

The weight ratio one or more polymers (P) to chips is suitably from about 1:500 to about 1:5, preferably from about 1:100 to about 1:10, most preferably from about 1:50 to about 1:20.

The moisture content of the chips before mixing with the one or more polymers (P) is suitably from 0 to about 30 weight %, preferably from 0 to about 10 weight %, most preferably from 0 to about 5 weight %.

The moisture content of the mixture of chips and adhesive system at the beginning of the pressing is suitably from about 3 to about 25 weight %, preferably from about 5 to about 20 weight %, more preferably from about 7 to about 15 weight %, most preferably from about 7 to about 12 weight %.

Examples of suitable starches are native starches and modified starches made from, e.g., potato, corn, wheat, rice, peas etc., such as: acetylated degraded starch, alkyl succinic acid modified starch, oxidated starch, hydroxypropylated starch, cationic starch, amylopectin starch, high amylose acetylated starch, tapioka starch, native potato starch, native corn starch, native wheat starch, native rice starch, and, native pea starch.

The one or more polymers (P) suitably comprise monomer units containing an amine or an amide group. Suitably, from about 5 to about 100% of the monomer units in the one or more polymers (P) contain an amine or an amide group, preferably from about 25 to about 100%, more preferably from about 50 to about 100%, even more preferably from about 90 to about 100%. Most preferably all of the monomer units in the one or more polymers (P) contain an amine or an amide group.

The one or more polymers (P) suitably contain a primary amine group or an amide group. The one or more polymers (P) preferably comprise one or more of polyvinyl amine, poly(vinylalcohol-co-vinyl amine), poly(vinylalcohol-co-vinylformamide), polyallylamine, polyethylene imine, polyamidoamine and polyvinyl formamide. More preferably the one or more polymers (P) comprise one or more of polyvinyl amine and poly(vinylalcohol-co-vinylamine). Most preferably polymer (P) is polyvinyl amine.

In one embodiment, the one or more polymers (P) suitably belong to the group of vinyl polymers. In such a case, the one or more polymers (P) preferably comprise one or more of polyvinyl amine, poly(vinylalcohol-co-vinylamine), poly(vinylalcohol-co-vinylformamide), polyallyl amine, and polyvinyl formamide. More preferably the one or more vinyl polymers (P) contain a primary amine group. Most preferably vinyl polymer (P) is polyvinyl amine.

In one embodiment, the one or more polymers (P) suitably contain primary amino groups or pendant amide groups. The one or more polymers (P) preferably comprise one or more of polyvinyl amine, poly(vinylalcohol-co-vinyl amine), poly(vinylalcohol-co-vinylformamide), polyallylamine, polyethylene imine and polyvinyl formamide. Most preferably polymer (P) is polyvinyl amine or polyethylene imine.

Polyvinyl amine is usually made by hydrolysing polyvinyl formamide to a certain degree. By "polyvinyl amine" is herein meant a polyvinyl amine wherein the mole ratio of amine groups to formamide groups is from 5:95 to 100:0. If the mole ratio of amine groups to formamide groups is less than 5:95 the polymer is defined as a polyvinyl formamide. The mole ratio of amine groups to formamide groups in the polyvinyl amine is preferably from about 10:90 to about 100:0, more preferably from about 50:50 to about 100:0, most preferably from about 80:20 to about 100:0.

Poly(vinyl alcohol-co-vinyl amine) is usually made by co-polymerising vinyl acetate and vinyl formamide followed by hydrolysis which gives a co-polymer having vinyl alcohol and vinyl amine units. There may also be remaining formamide groups in the co-polymer and also remaining acetate groups. The mole ratio of amine groups to formamide groups in the poly(vinyl alcohol-co-vinyl amine) is from 5:95 to 100:0. If the number ratio of amine groups to formamide groups is less than 5:95 the polymer is defined as a poly(vinyl alcohol-co-vinyl formamide). The mole ratio of hydroxyl groups to acetate groups in the poly(vinyl alcohol-co-vinyl amine) or poly(vinyl alcohol-co-vinyl amide) is suitably from about 25:75 to 100:0, preferably from about 75:25 to 100:0. The mole ratio of amine and formamide groups to hydroxyl and acetate groups in the poly(vinyl alcohol-co-vinyl formamine) or poly(vinyl alcohol-co-vinyl formamide) is suitably from about 3:97 to about 100:0, preferably from about 10:90 to about 100:0, most preferably from about 25:75 to about 100:0.

The one or more polymers (P) have suitably a weight average molecular weight of from about 1.000 to about 1.000.000 g/mol, preferably from about 10.000 to about 800.000 g/mol, more preferably from about 20.000 to about 600.000 g/mol, most preferably from about 50.000 to about 500.000 g/mol.

The adhesive system may also be combined with a further composition, suitably an adhesive composition, based on a dispersion of a polymer or copolymer of one or more ethylenically unsaturated monomers. Examples of suitable polymers or copolymers of one or more ethylenically unsaturated monomers are vinyl ester homopolymers such as polyvinyl acetate, copolymers of vinylesters such as ethylene-vinyl acetate copolymer (EVA) or copolymers of vinylacetate with acrylic monomers such as methylmethacrylate or butylacrylate, styrene-butadiene rubber (SBR), and polyacrylates. In this case, the amount of starch based adhesive is suitably from about 10 to about 99 weight %, preferably from about 25 to about 85 weight %, most preferably from about 50 to about 75 weight %, based on the total of wet adhesive system components.

The adhesive system may also be combined with a cross-linker shortly before use. Suitable cross-linkers are those which are reactive to amino and/or hydroxyl groups. Examples of crosslinkers are: isocyanates, monomers or polymers containing adipic acid, melamine formaldehyde resin, urea formaldehyde resin, melamine salts, aldehydes such as glutaraldehyde, glyoxal, and polymeric aldehydes such as dialdehyde starches, and, complexing agents such a zirconium salts. It may be added to any of the two components of the adhesive system. If used, the amount of the cross-linker in a component of the adhesive system is suitably up to about 30 weight %, or from about 0.1 to about 30 weight %.

The adhesive system suitably further comprises one or more polymers (P1) containing acetoacetoxy groups. The content of acetoacetoxy groups in the one or more polymers (P) is suitably from about 0.05 to about 15 mole %, preferably from about 1 to about 10 mole %. The one or more polymers (P1) preferably comprise acetoacetylated polyvinyl alcohol (AAPVA).

The one or more polymers (P1) have suitably a weight average molecular weight of from about 1.000 to about 5.000.000 g/mol, preferably from about 10.000 to about 2000.000 g/mol.

The one or more components of the adhesive system comprising starch, polymer (P) and polymer (P1) respectively may further comprise additives such as viscosity adjusting agents and fillers such as kaolin, wheat meal, soy meal, walnut shell meal, or other known to be suitable for use in wood adhesive formulations.

The component of the adhesive system comprising the one or more polymers (P) or (P1) may also comprise inorganic- or organic salts. A part of the one or more polymers (P) may be ionically charged, preferably cationically charged. The amount of negative counter-ions of the salts in the component comprising the one or more polymers (P) can be from 0 to about 30 weight %, or from about 0.1 to about 20 weight %, or from about 0.5 to about 10 weight %.

In one embodiment of the method the first component applied comprises starch, the second component applied comprises a solution or dispersion of the one or more polymers (P) and the third component applied comprises a solution or dispersion of the one or more polymers (P1). The first component applied is suitably a solid starch material.

In one embodiment of the method the first component applied comprises a solution or dispersion of the one or more polymers (P), the second component applied comprises a solution or dispersion of the one or more polymers (P1) and the third component applied comprises starch, either as a solution or dispersion, or as a solid material.

The pressing suitably takes place at an elevated temperature. The pressing temperature depends on which wood based product intended to be manufactured but is suitably from about 50 to about 250° C., preferably from about 100 to about 225° C., most preferably from about 150 to about 200° C.

The pressing time and pressing temperature are linked so that lower pressing temperatures generally require longer pressing times. The wood based product to be produced does also determine suitable pressing temperatures and pressing times. The pressing time is suitably at least about 10 s, also suitably from about 10 s to about 60 minutes, preferably at least about 30 s, also preferably from about 30 s to about 30 minutes, most preferably at least about 1 minute, also preferably from about 1 to about 15 minutes.

The present invention also relates to a wood based product obtainable by the method of producing a wood based product.

The wood based product of the invention is suitably a laminated or veneered material, such as laminated flooring, veneered flooring, a veneered furniture material, plywood, a wall panel, a roofing panel, a laminated beam, or a composite product such as a particle board, fibre board, chip board or oriented strand board. Preferably, it is plywood, a veneered furniture material, veneered flooring, laminated flooring or a particle board.

In one embodiment, the wood based product of the invention comprises one or more layers, joined with one or more adhesive joints comprising starch and one or more polymers (P) containing an amide group or an amide group.

In one embodiment, the wood based product of the invention comprises a composite product comprising wood based chips joined together with an adhesive comprising starch and one or more polymers (P) containing an amide group or an amide group groups. The composite product suitably comprises from about 70 to about 98 weight %, preferably from about 80 to about 90 weight %, of wood based material, from about 2 to about 25 weight %, preferably from about 5 to about 15 weight %, of starch, and from about 0.5 to about 10 weight %, preferably from about 2 to about 6 weight % of the one or more polymers (P), the amounts calculated as dry weight of the composite product.

The composite product is preferably a chip-, particle- or fibre board, or an oriented strand board.

The invention is further illustrated by means of the following non-limiting examples. Parts and percentages relate to parts by weight respectively percent by weight, unless otherwise stated.

EXAMPLES

Example 1

A particle board was manufactured by mixing 864 g wood chips, having a moisture content of 2 weight %, with 205 g of a 11 weight % polyethylene imine solution (Polymin® SK, from Basf), followed by mixing in 85.3 g of corn starch (C*Gum NC 03432 from Cerestar, 10% moisture content). The chips mixture was pressed into a board of 16 mm thickness. The pressing was made at 189° C. during three minutes. The sequence of pressure was 160 kg/cm$^2$ during 30 s, 40 kg/cm$^2$ during 2.5 min and no pressure during the last 30 s.

The tensile strength (internal bond, IB) was measured by gluing pieces of 5×5 cm onto two metal blocks and tearing them apart. Thickness swelling (TSW) and water absorption (ABS) were also measured. Thickness swelling was measured by determining the degree of swelling after a piece of 5×5 cm had been immersed in water (20° C., 24 hrs). Water absorption was measured by determining the weight increase after a piece of 5×5 cm had been immersed in water (20° C., 24 hrs).

The IB value was 190 kPa, TSW 35% and ABS (24 h) was 136%.

Example 2

Particle boards were manufactured in a smaller scale by mixing 50.7 g wood chips respectively, having a moisture content of 2 weight %, with 10.9 g of an aqueous solution of about 4 weight % (11 weight % including salts) polyvinyl amine (Lupamin® 9095 from Basf), followed by mixing in 5 g and 10 g respectively of corn starch (C*Gum NC 03432 from Cerestar, 10% moisture content). The chips mixtures were pressed into boards of 10 mm thickness. The pressing was made at 9 kg/cm² at 180-185° C. during 5 minutes. The internal bond strength (IB) was measured by gluing pieces of 5×5 cm onto two metal blocks and tearing them apart.

As a reference two boards were made in the same way but instead of using a polyvinyl amine solution, 10.9 g of water was added instead.

TABLE 4

| Wood chips (g) | Starch (g) | Polyvinyl amine (4 weight %) (g) | Moisture content of board (%) | IB (kPa) |
|---|---|---|---|---|
| 50.7 | 5 | 10.9 | 16.8 | 657 |
| 50.7 | 10 | 10.9 | 16.8 | 613 |
| 50.7 | 5 | — | 16.8 | 129 |
| 50.7 | 10 | — | 16.8 | 127 |

The invention claimed is:

1. Method of producing a wood based product, comprising applying an adhesive system onto one or more pieces of a wood-based material, and joining the one, or more pieces with one or more further pieces of a material, the adhesive system comprises one component comprising starch and another component comprising one or more polymers (P) containing an amine group or an amide group, the two components are applied onto the wood based material as separate components.

2. Method according to claim 1, wherein the two components are applied in a sequence of time from each other, as a first component applied and as a second component applied onto the wood based material.

3. Method according to claim 2, wherein the first component applied comprises the one or more polymers (P) and the second component applied comprises starch.

4. Method according to claim 3, wherein the first component applied comprising the one or more polymers (P) is dried after application and before the second component comprising starch is applied.

5. Method according to claim 1, wherein the weight ratio starch to the one or more polymers (P) is from about 1:2 to about 100:1.

6. Method according to claim 1, wherein the weight ratio starch to the one or more polymers (P) is from about 2:1 to about 20:1.

7. Method according to claim 1, comprising mixing wood based chips with the adhesive system, and joining the chips.

8. Method according to claim 1, wherein the wood based product is a chip-, particle-, or fibre board, or an oriented strand board.

9. Method according to claim 1, comprising applying the adhesive system onto a sheet-like material, and joining it with a further sheet-like material.

10. Method according to claim 7, wherein the weight ratio one or more polymers (P) to chips is from about 1:100 to about 1:10.

11. Method according to claim 1, wherein the one or more polymers (P) comprises a primary amine group or an amide group.

12. Method according to claim 1, wherein the one or more polymers (P) belong to the group of polyvinyl amine, poly(vinylalcohol-co-vinyl amine), poly(vinylalcohol-co-vinyl-formamide), polyallylamine, polyethylene imine and polyvinyl formamide.

13. Method according to claim 1, wherein the adhesive system comprises one or more polymers (P1) comprising acetoacetoxy groups.

14. Method of producing a chip-, particle-, or fibre board, or an oriented strand board, comprising applying an adhesive system onto one or more pieces of a woodbased material, and joining the one or more pieces with one or more further pieces of a material, the method comprises mixing wood based chips with the adhesive system and joining the chips, the adhesive system comprises one component comprising starch and another component comprising one or more polymers (P) containing an amine group or an amide group, the weight ratio one or more polymers (P) to chips is from about 1:100 to about 1:10, the two components are applied onto the wood based material as separate components.

* * * * *